United States Patent [19]

Pinkerton

[11] Patent Number: 4,491,459

[45] Date of Patent: Jan. 1, 1985

[54] PORTABLE OXYGEN ENRICHMENT AND CONCENTRATION SYSTEM

[76] Inventor: Charles J. Pinkerton, 2528 E. Terrace, Apt. B, Anaheim, Calif. 92806

[21] Appl. No.: 491,420

[22] Filed: May 4, 1983

[51] Int. Cl.$^3$ .............................................. B01D 53/04
[52] U.S. Cl. ...................................... 55/163; 55/179; 55/389
[58] Field of Search ............... 55/18, 21, 31, 33, 58, 55/62, 68, 75, 161-163, 179, 180, 198, 387, 389

[56] References Cited

U.S. PATENT DOCUMENTS

| | | | |
|---|---|---|---|
| 2,501,541 | 3/1950 | Sharp | 62/140 |
| 2,944,627 | 7/1960 | Skarstrom | 55/33 |
| 3,149,934 | 9/1964 | Martin | 55/62 X |
| 3,164,454 | 1/1965 | Wilson | 55/68 |
| 3,225,516 | 12/1965 | Smith et al. | 55/179 X |
| 3,237,377 | 3/1966 | Skarstrom | 55/25 |
| 3,280,536 | 10/1966 | Berlin | 55/58 |
| 3,323,288 | 6/1967 | Cheung et al. | 55/179 X |
| 3,323,291 | 6/1967 | Kern | 55/179 X |
| 3,533,221 | 10/1970 | Tamura | 55/33 |
| 3,543,482 | 12/1970 | Foster | 55/179 X |
| 3,659,399 | 5/1972 | Kauer, Jr. et al. | 55/163 X |
| 3,715,866 | 2/1973 | Chatlos et al. | 55/179 |
| 3,719,025 | 3/1973 | Heinze | 55/31 |
| 3,738,087 | 6/1973 | McCombs | 55/62 X |
| 3,744,216 | 7/1973 | Halloran | 55/102 |
| 3,861,894 | 1/1975 | Marsh | 55/316 |
| 3,880,616 | 4/1975 | Myers et al. | 55/62 |
| 3,902,875 | 9/1975 | Bridigum et al. | 55/179 X |
| 3,930,813 | 1/1976 | Gessner | 55/16 |
| 3,930,814 | 1/1976 | Gessner | 55/16 |
| 3,975,463 | 5/1976 | Drissel et al. | 55/25 |
| 3,976,451 | 8/1976 | Blackmer et al. | 55/158 |
| 3,979,190 | 9/1976 | Hedman | 55/158 |
| 4,013,429 | 3/1977 | Sircar et al. | 55/33 |
| 4,065,272 | 12/1977 | Armond | 55/25 |
| 4,129,424 | 12/1978 | Armond | 55/25 |
| 4,144,037 | 3/1979 | Armond et al. | 55/62 X |
| 4,174,955 | 11/1979 | Blackmer et al. | 55/158 |
| 4,190,424 | 2/1980 | Armond et al. | 55/58 |
| 4,194,891 | 3/1980 | Earls | 55/26 |
| 4,222,750 | 9/1980 | Gauthier et al. | 55/58 |
| 4,231,768 | 11/1980 | Seibert et al. | 55/179 |
| 4,247,311 | 1/1981 | Seibert et al. | 55/179 X |
| 4,263,018 | 4/1981 | McCombs et al. | 55/179 X |
| 4,264,338 | 4/1981 | Null | 55/16 |
| 4,272,265 | 6/1981 | Snyder | 55/179 X |
| 4,295,343 | 10/1981 | Izumi | 62/309 |
| 4,312,641 | 1/1982 | Verrando et al. | 55/33 |
| 4,322,223 | 3/1982 | Christel, Jr. | 55/18 |
| 4,322,228 | 3/1982 | Myers et al. | 55/179 X |
| 4,329,158 | 5/1982 | Sircar | 55/26 |
| 4,331,455 | 5/1982 | Sato | 55/62 X |
| 4,349,357 | 9/1982 | Russell | 55/179 X |
| 4,386,945 | 6/1983 | Gardner | 55/62 X |
| 4,404,005 | 9/1983 | Hamlin et al. | 55/179 X |

OTHER PUBLICATIONS

Service Manual DeVilbiss Company, DeVO$_2$ Model 955, pp. cover, 1-3.
Service Manual John Bunn Co., Boras 290 Plus, p. 6.
Service Manual John Bunn Co., R$_x$O$_2$, p. 6.

*Primary Examiner*—Robert Spitzer
*Attorney, Agent, or Firm*—Knobbe, Martens, Olson & Bear

[57] ABSTRACT

An oxygen enrichment and concentration system draws air from the ambient atmosphere and includes a set of primary adsorption beds and a set of secondary adsorption beds to adsorb components of the air other than oxygen. A blower and valves connected between the primary adsorption beds and the secondary adsorption beds alternatively direct the flow of air through one or the other bed of each set of adsorption beds. The enriched and concentrated oxygen product is stored in a storage vessel. A purge conduit connects the outlet of each of the secondary adsorption beds with the outlet of another secondary adsorption bed and the outlet of one of the primary adsorption beds so a small portion of the purified product from one adsorption bed is directed in a reverse direction through the other adsorption bed of the secondary set and the adsorption bed of the primary set to cleanse the adsorption material. Following such cleansing the purge gas is exhausted to the atmosphere and the cleansed adsorption bed is ready to again adsorb nonoxygen components of air.

13 Claims, 8 Drawing Figures

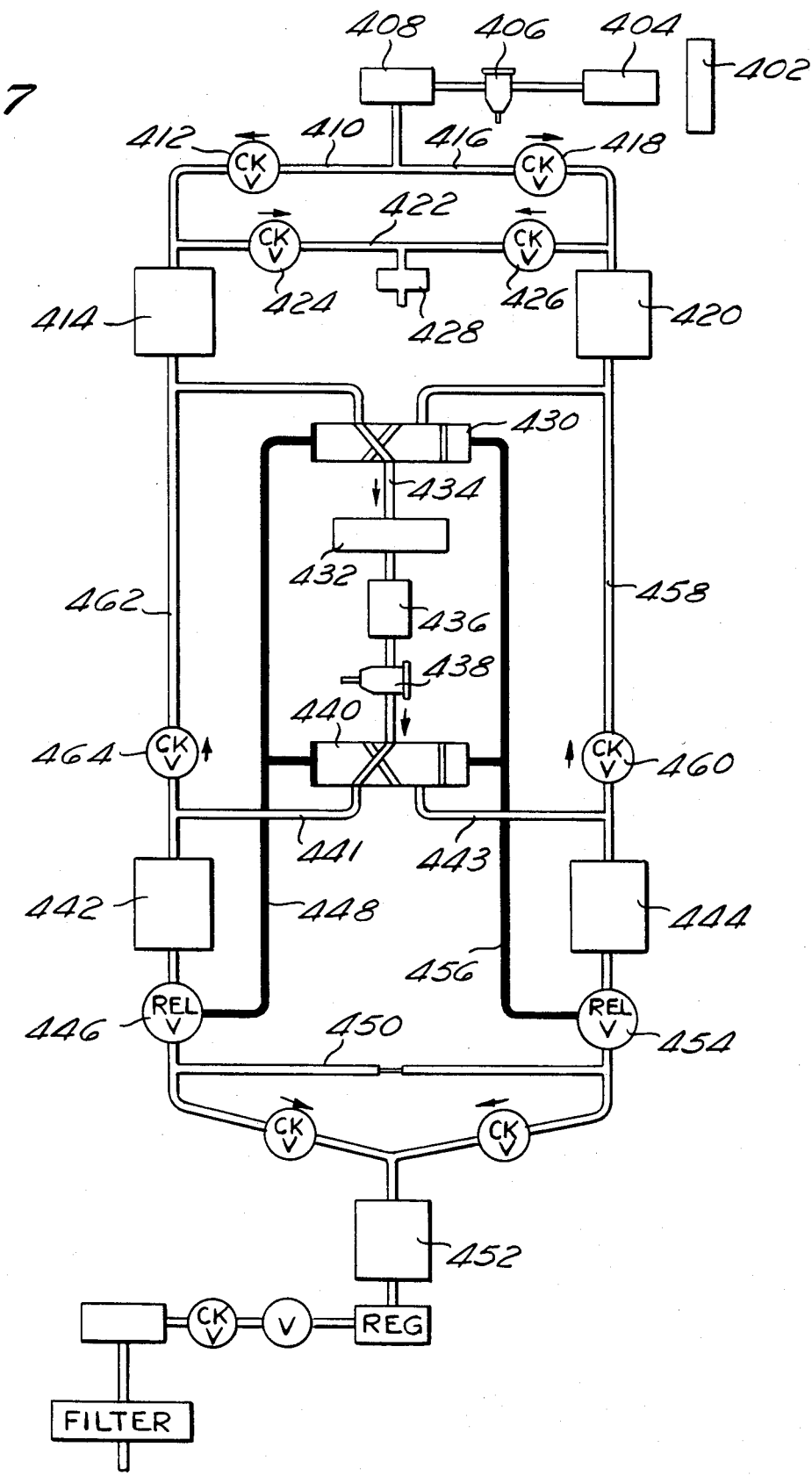

PORTABLE OXYGEN ENRICHMENT AND CONCENTRATION SYSTEM

BACKGROUND OF THE INVENTION

This invention relates generally to fractionation of air by selective adsorption, and particularly to apparatus and processes using gas permeable membranes and adsorbent materials for increasing the concentration of oxygen of atmospheric air and decreasing the concentration of nitrogen.

Patients suffering from respiratory ailments such as emphysema and pneumonia, which severely restrict the patient's lung capacity, are commonly provided with a source of oxygen-enriched air.

A common source for enriched oxygen is a metal cylinder containing oxygen under a high pressure. The oxygen is supplied through suitable tubing and pressure regulators to the patient. The cylinders are heavy and cumbersome and present a danger of fire and explosion. Additionally, relying on oxygen cylinders requires that the user have enough oxygen in the cylindrs to last the time between available refillings. The oxygen cylinders are also quite limited in the amount of oxygen they can hold. This requires either maintaining a large supply of oxygen cylinders or frequent trips to a recharging station to replenish the oxygen.

Another source of enriched oxygen is a metal cylinder storing liquid oxygen. This is in many ways similar to the storing of oxygen gas under high pressure. However, the liquid oxygen storage does not present the dangers associated with the high pressure of storing the oxygen gas. Nevertheless, the liquid oxygen is hazardous because it must be kept at an extremely low temperature, which will cause severe burns to the skin if the liquid oxygen contacts a person's skin. Again, sufficient oxygen must be kept on hand to supply the user between times when the storage cylinders can be refilled.

Systems for taking room air, which is 21% oxygen, and concentrating the oxygen to obtain a much higher percentage of oxygen are useful in that they do not require the refilling of oxygen cylinders, and can supply a virtually continuous flow of oxygen. However, the plumbing of these continuous supply systems is typically complicated and subject to leaks, and requires a large amount of power to drive the gasses through the system. These systems therefore generally use components that require a 110 volt AC power source, making these systems large and heavy. Thus, these systems are not portable, and the user is limited in his mobility if he needs frequent or continuous oxygen supply.

SUMMARY OF THE INVENTION

According to the present invention, a system for concentrating and enriching the oxygen content of air to provide a continuous supply of oxygen uses simplified plumbing and valves to permit the system to operate with low power requirements, and with a minimum of adsorption material so the system can be made small, light weight, and portable. A system constructed according to the invention makes efficient use of the adsorption material so a minimum amount of air is required to be processed to obtain a given amount of oxygen.

According to the invention, the gas concentration and enricher includes a primary adsorption bed and a pair of secondary adsorption beds with a blower and valving means connected between the primary adsorption bed and the secondary adsorption beds. The valving means alternatively directs gas flow through the first secondary adsorption bed or through the second secondary adsorption bed. A purge conduit connecting the outlets of the first and second secondary adsorption beds allows the secondary adsorption bed not being used to be purged of the components of the gas adsorbed during another stage of the operational cycle.

Positioning the valving means and the blower between the primary adsorption bed and the secondary adsorption beds permits the use of fewer valves than in prior devices, simplifying the plumbing arrangements so the system is less prone to leaks and pressure losses. Additionally, the arrangement of the invention allows a smaller blower to be used, which blower may require less power to drive the air through the system than prior systems.

An oxygen concentrator and enricher constructed according to the invention is lighter and more portable than the prior art devices, and additionally is quieter and uses less power than prior concentration and enrichment systems. Further, the system constructed according to the invention is less hazardous than the prior systems since it stores less oxygen at any given time.

BRIEF DESCRIPTION OF THE DRAWINGS

FIG. 7 is a pneumatic schematic diagram of a fourth embodiment of the invention.

DESCRIPTION OF THE PREFERRED EMBODIMENTS

Figure 1:
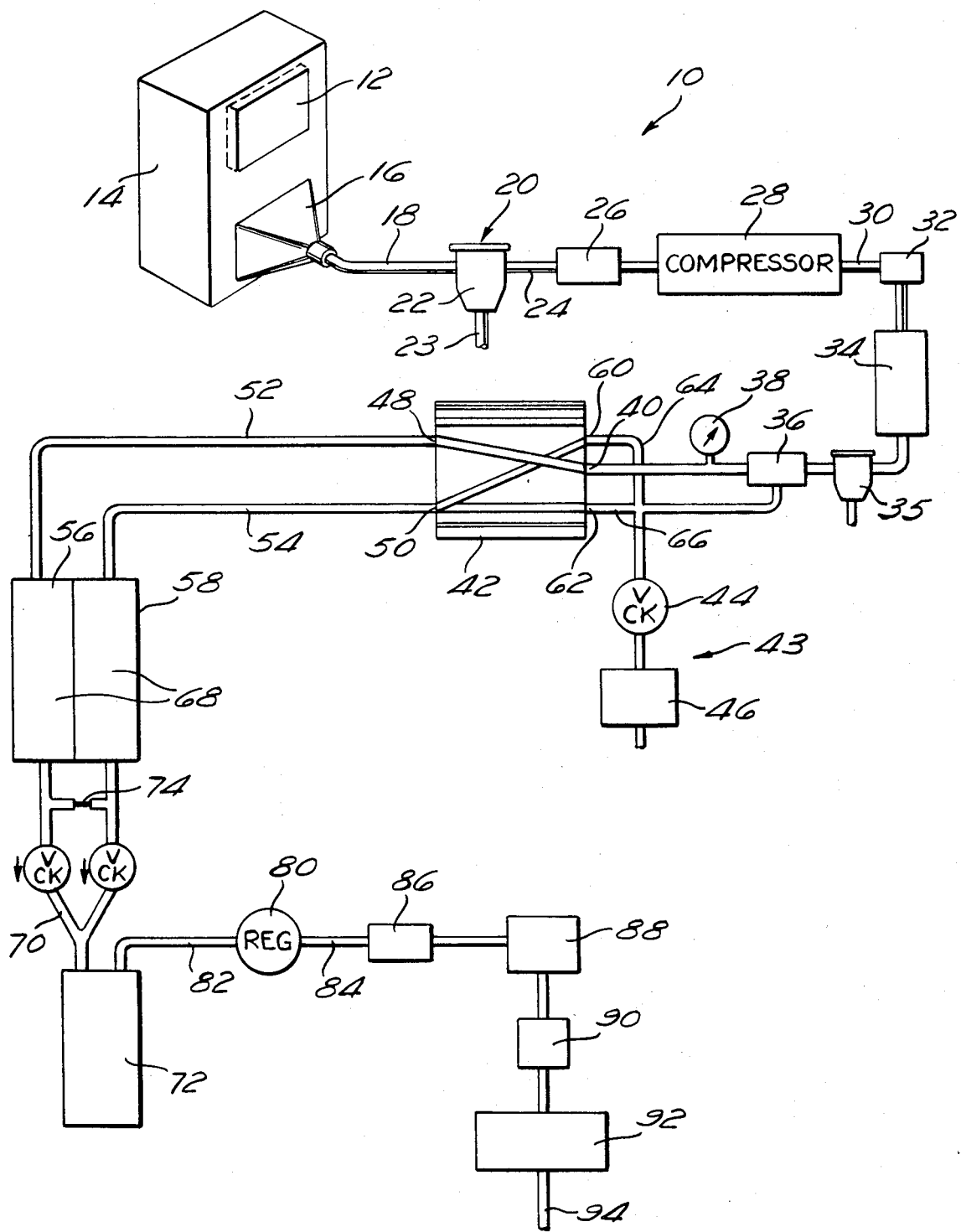
FIG. 1 is a pneumatic schematic diagram of a first embodiment of the invention.
Figure 2:
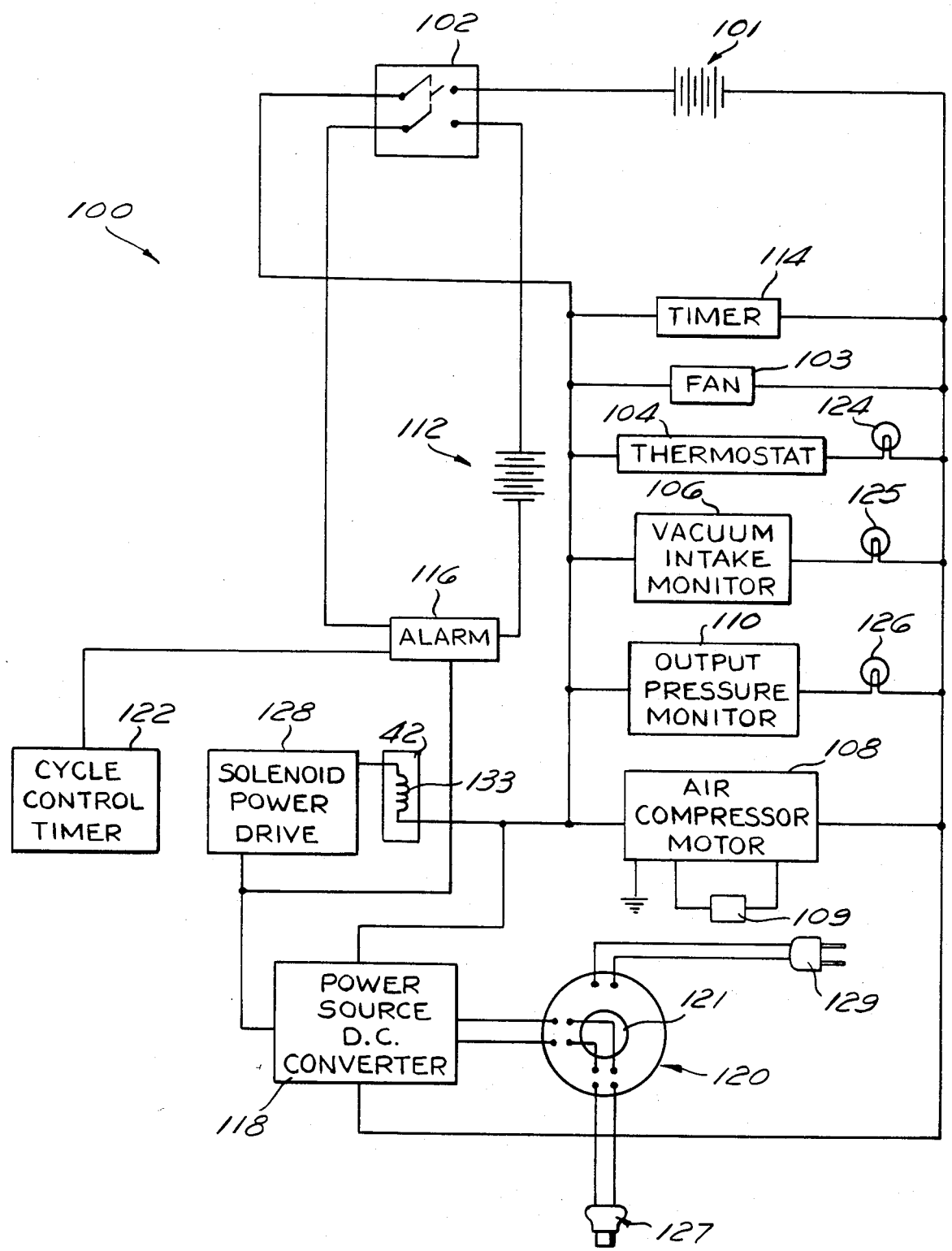
FIG. 2 is an electrical schematic diagram of an electrical control system used with the apparatus of FIG. 1.

The Embodiment of FIGS. 1 and 2

Referring to FIG. 1, a portable oxygen enrichment and concentration system 10 constructed according to the invention draws air through a gross particle filter 12 into a membrane stack 14, or filter. The gross particle filter 12 removes dust, soot, and other particulate matter from the air as it is drawn into the system. This particulate matter would seriously interfere with the efficient operation of the remaining elements of the system. The membrane stack 14, which is of a type well known in the art, partially absorbs gas molecules in the air other than oxygen and argon. Suitable for the membrane stack 14 are filters heavily implanted with an inorganic silicate material, held together with a clay base, and shaped in a granular form with a minimum of two flat sides to give maximum surface or molecule adsorption area.

The membrane stack 14 has an outlet funnel 16 connected to a tube 18 leading to a water trap 20. The water trap 20 removes moisture from the air by using centripetal force to drive water molecules into a water collection chamber 22. The collected water can be removed through a drain 23. A second tube 24 leads the partially purified air from the water trap 20 past a gas flow sensor 26, which monitors the vacuum in the pneumatic system to sense vacuum changes that may indicate a leak in the system or other problem. The gas then flows into a compressor 28.

The compressor 28 is preferrably operable when connected to a 12-volt direct current electrical power source (not shown). The compressor 28 can be a standard reciprocating piston air compressor motor capable of a flow between 60 liters per minute and 150 liters per minute at a pressure of between 5 pounds per square inch and 80 pounds per square inch. Optionally, a rotary compressor having the same specifications can be used. A rotary compressor has a lower level of friction, a lower temperature, and a lower noise level. A carbon vane rotary compressor may also be used to provide longer life for the compressor and the ability to produce higher pressures.

A third tube 30 carries the air from the compressor 28 through a start solenoid 32 into a heat exchanger 34. The start solenoid 32 closes when the system is turned off so contaminants do not flow through the system when the device is not being used. The heat exchanger 34 can be one of a number of commonly available types of heat exchangers. The heat exchanger 34 is preferably made of aluminum for maximum heat conductivity. Among the designs suitable for use in the system is a fin design in which a plurality of aluminum fins are attached to the exterior of the air conduit. The fin design of heat exchanger gives the maximum thermal conductivity and cooling ability. Alternatively, the aluminum pipe forming the gas conduit can be formed in a circular or spiral configuration to provide conduit contact with the air for cooling. A second alternative is to form a part of the conduit into a pan-shaped aluminum chamber. These two alternative heat exchanger designs have a lesser degree of thermal conductivity than the fin design, but the level of conductivity may be sufficient for particular systems. A fan (not shown) can be installed to blow air across the heat exchanger to increase the efficiency of the heat exchanger.

The partially purified air emerges from the heat exchanger 34 to a secondary water trap 35. Vaporized water in the gas tends to condense in the heat exchanger, so the secondary water trap can efficiently remove the water and the water does not contaminate the sieve beds 56,58.

The gas then flows to a pressure compensator 36. The pressure compensator 36 supplies air through a pressure gauge 38 to an input port 40 of a four-way solenoid valve 42 and also provides air to the exhaust 43, which includes a check valve 44 and an exhaust muffler 46.

The four-way solenoid valve 42 has a pair of primary output ports 48, 50, which supply air through a pair of corresponding tubes 52, 54 to a pair of molecular sieve beds 56, 58, respectively. The four-way solenoid valve 42 has a pair of secondary output ports 60, 62, which selectively duct exhaust gasses to the exhaust 43 through a pair of tubes 64, 66, respectively.

The four-way solenoid valve 42 operates so when the first primary output port 48 is connected to the input port 40, the second primary output port 50 and the second secondary output port 62 are open to each other to couple the second tube 54 to the exhaust 43. When the second primary output port 50 is coupled to the input port 40, the first secondary output port 60 is coupled to the first primary output port 48 to connect the first tube 52 to the exhaust 43.

The four-way solenoid valve 42 can be either a single solenoid action type or a dual solenoid action type. The dual solenoid action valve gives more reliable setting of the valve, and has a longer operating life than the single solenoid type, but is larger and needs a greater amount of power to operate it.

The first and second sieve beds 56, 58 contain a suitable sieve material 68 that adsorbs molecules other than oxygen and argon from the air. It is well-known that air is approximately 21% oxygen and 78% nitrogen. Therefore, increasing the oxygen content of air primarily involves removing nitrogen from the air to reduce the nitrogen content below that of normal atmospheric air. Adsorbent materials for adsorbing nitrogen are known in the art. Inorganic silicates have been found to make good sieve material, and are well known in the art. One inorganic silicate found to be particularly effective is MG3 TM, manufactured by Linde-Union Carbide.

Each of the sieve beds 56, 58 can be of the known types of sieve beds, including single chamber and double chamber types. The preferred construction is of the double chamber type, in which the incoming air passes through one chamber before passing through the second chamber and then out of the sieve bed. Whether of the single chamber or double chamber type, a size of approximately 12 inches in length, 2 inches in width, and 2 inches in depth has been found to give satisfactory adsorption qualities for the quantity of oxygen a system such as this is to produce.

When the first primary output port 48 of the solenoid value 42 is open to the valve input port 40, the air drawn into the system by the compressor 28 flows through the first tube 52 and enters the first sieve bed 56. The output of the first sieve bed 56 is medical grade oxygen. Since the air has been partially purified and the oxygen concentration increased by the membrane stack 14, the sieve bed 56 does not need to perform all the adsorption of the nitrogen. This dual adsorption of the nitrogen permits each of the membrance stacks 14 and the sieve bed 56 to be relatively smaller than prior systems, so each can operate more efficiently.

The majority of the oxygen output of the first sieve bed 56 travels through a tube 70 to a product tank 72, while a small portion of the output of the first sieve bed 56 is diverted through a purge tube 74 and forced through the second sieve bed 58 to purge impurities therefrom. The purge tube 74 is of a restricted diameter or has a restricted orifice so only a small portion of the output of the first sieve bed 56 flows through the purge tube 74.

The oxygen that has entered the second sieve bed 58 through the purge tube 74 flows through the second sieve bed 58 and absorbs the nitrogen and other molecules previously adsorbed by the sieve material 68 during a previous cycle of the operation of the system. This purge gas then flows through the second tube 54 into the second primary output port 50 of the valve 42. Since the second secondary output port 62 is open to the second primary port 50, the purge gasses are exhausted through the second secondary output tube 66 and through the exhaust 43.

When the four way solenoid valve 42 opens the second primary output port 50 to the input port 40 to supply a primary output through the second tube 54 to the second sieve bed 58, the first primary output port 48 in the four-way solenoid valve 42 is opened to the first secondary port 60 and closed off from the input port 40. Most of the output of the second sieve bed 58 is supplied to the product tank 72, while a portion passes through the purge tube 74 into the first sieve bed 56 to remove impurities therefrom. As the oxygen flows through the first sieve bed 56 in a reverse direction it adsorbs the molecules of gas that had been absorbed by the inorganic silicate material 68. This purge gas then flows through the first tube 52, through the four-way solenoid valve 42 and out the exhaust 43.

The system 10 operates in a two-stage cycle. While the first sieve bed 56 is providing enriched oxygen to the product tank 72, the second sieve bed 58 is being purged to prepare the system for the second stage of the cycle. In the second stage of the cycle, the second sieve bed 58 supplies enriched oxygen to the product tank 72 while the first sieve bed 56 is being purged to prepare the system again for the first stage of the cycle. This two stage cycle continues indefinitely, alternating each sieve bed 56, 58 between a production mode and a cleaning mode.

The product tank 72 is an air tight aluminum or plastic container. The product tank 72 preferably has about the same interior volume as one of the sieve beds 56, 58, and is capable of storing the oxygen product from one cycle of the operation of the system. This product tank is not intended for long-term storage of the oxygen product, but is intended for maintaining a small reserve to ensure a continuous supply of oxygen in the event of a momentary interruption in the operation of the system, or if the demands or requirements of the user are momentarily greater than the production of the system. The product tank can be formed of the same casing as the casing on the sieve beds 56, 58.

The product tank 72 supplies oxygen-enriched air to a product pressure regulator 80 through a tube 82. The product regulator 80 maintains the even pressure of the oxygen product flow through the output tube 82,84 so the user is supplied with a supply of oxygen at predetermined rate, within established tolerances.

After passing through the product regulator 80, air passes through the output tube 84 to a flow limiter 86 and thence to a flow meter 88. The flow limiter 86 prevents the user from drawing off more oxygen than prescribed by his physician, and also prevents the user from exceeding the capacity of system. A product shutdown solenoid 90 is connected to the output of the flow meter 88. A bacteria filter 92 removes bacteria from the oxygen before the oxygen reaches an oxygen outlet 94 that supplies oxygen to a patient.

It has been found that to provide an oxygen flow of four liters per minute to a patient, the system should take in approximately 100 liters/min of room air. The 100 liters of room air has about 21 liters of oxygen in it. The oxygen produced that is not drawn off by the patient is used in purging the sieve beds 56, 58.

Gasses other than oxygen can be the output from the system by changing the sieve material 68 in the adsorbent beds 56, 58 to a material that will adsorb molecules other than the desired gas.

Referring to FIG. 2, a control system 100 that may be used in the system 10 is shown. The control system 100 includes a direct current power source 101, such as a 12 volt dry cell battery, having a negative terminal connected to an on/off switch 102 and a positive terminal connected to a fan 103, a thermostat 104, a vacuum intake monitor 106, a compressor motor 108 for the compressor 28, and an output monitor 110. The negative output of the switch 102 is connected to the fan 103, the thermostat 104, the vacuum intake monitor 106, the compressor motor 108, and the output monitor 110 so that closing the switch 102 supplies 12 volt electrical energy to these components. The thermostat 104, the vacuum intake monitor 106, and the output monitor 110 each include an indicator lamp 124, 125, 126, respectively. A thermal switch 109 is connected to the air compressor motor 108 so that if the air compressor motor overheats, it is automatically shut down to prevent a serious damage to the motor.

A three-position power source selection switch 120 permits selection of one of three different power sources for the air compressor motor 108 and the fan 103. The switch 120 includes a rotary switching element 121 for connecting the power source D.C. converter 118 to either an A.C. plug 129 or a D.C. plug 127 suitable for connection to an automobile cigarette lighter. As shown in FIG. 2, the switching element 121 is set to connect the D.C. plug 127 to the power converter 118 to power the system.

Rotating the switching element 121 90° clockwise connects the A.C. plug 129 to the power source converter 118. This permits the system to be run off standard household 110 volt A.C. power. The power source converter 118 converts the input power to proper voltage level to power the system components, which in the embodiment discussed are powered by 12 volt direct currect power.

Rotating the switching element 121 180° C. from the position shown in FIG. 2 disconnects both the A.C. plug 129 and the D.C. plug 127 from the circuit, so the primary power source 101 powers the system components.

The alarm circuit 116 is coupled to the system to alert the user to any malfunction in the system that may jeopardize the operation of the system and the continued supply of oxygen to the user. The alarm 116 is connected to its own power source 112, in addition to the system power source 101. This separate power source may be a 9 volt dry cell battery or similar backup power system.

The solenoid power drive 128 is connected to a solenoid operator coil 133 in the four-way solenoid valve 42 (FIG. 1). This coil operates the solenoid valve. If a dual solenoid type valve is used for the four-way valve 42, then a second solenoid operating coil similar to the operating coil 133 would be connected to a second solenoid power drive.

The cycle time control unit 122 controls the timing of the operation of the solenoid power drive to control the operation of the four-way solenoid valve 42. As discussed above, the control of this four-way valve 42 determines the cycles of operation of the system for alternatively supplying oxygen through the first and second sieve beds 56, 58.

Figure 3:
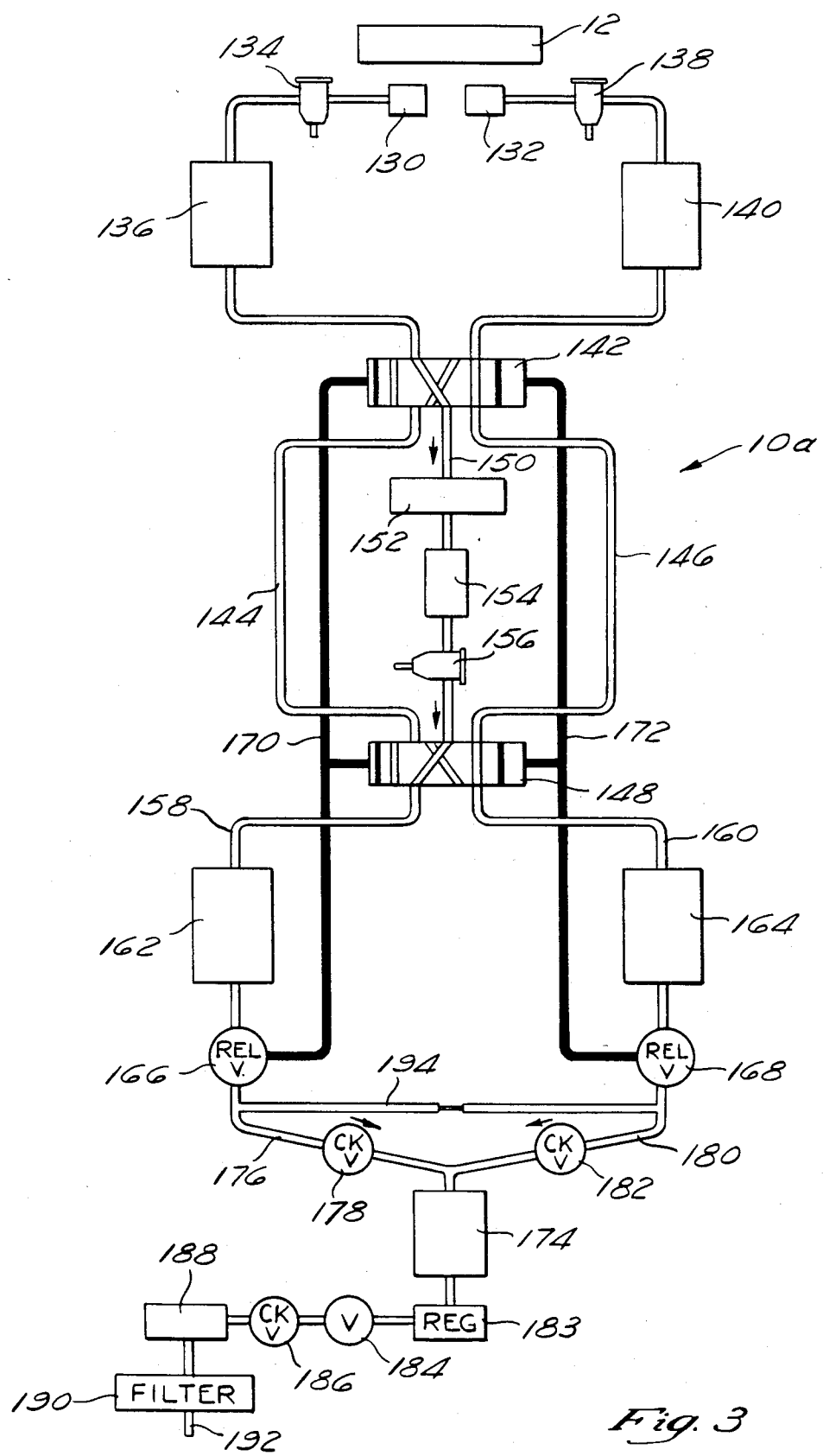
FIG. 3 is a pneumatic schematic diagram of a second embodiment of the invention.
Figures 4, 6, 8:
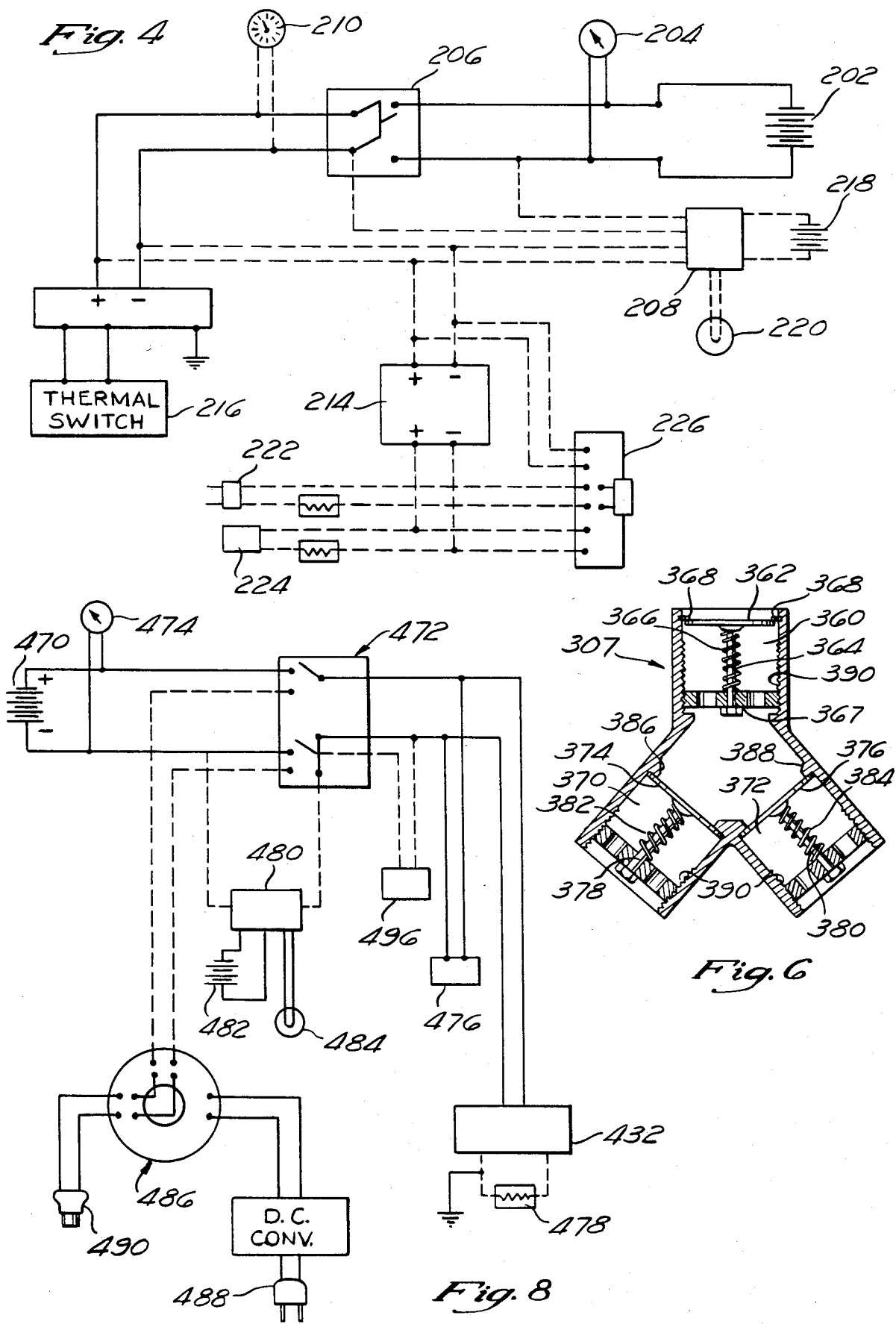
FIG. 4 is an electrical schematic diagram of the control system used with the apparatus of FIG. 3.
FIG. 6 is a cross sectional view of the intake valve assembly used in the apparatus of FIG. 5.
FIG. 8 is an electrical schematic diagram of the control system used with the apparatus of FIG. 7.

The Embodiment of FIGS. 3 and 4

FIG. 3 illustrates a second embodiment of the invention in which air is taken in to the system 10a through a gross particle filter 12 into a pair of intake mufflers 130, 132. Air output from the first intake muffler 130 passes through a primary water trap 134 before entering a first primary adsorption bed 136. Similarly, air from the second intake muffler 132 passes through a second primary water trap 138 and is then input to a second primary adsorption bed 140. The gross particle filter 12 removes large particulate matter, such as dust, from the intake air. The intake mufflers 130, 132 include baffles for reducing noise caused by air flow into the system. The primary water traps 134, 138 remove water from the intake air.

The outputs of the primary adsorption beds 136, 140 are input to a primary four-way control valve 142. A pair of tubes 144, 146 connect the primary four-way control valve 142 to a secondary four-way control valve 148. A tube 150 extends between the primary four-way control valve 142 and an air blower or compressor 152, which draws air through to primary four-way control valve 142 and forces the air through a heat exchanger 154 and a second water trap 156 to the secondary four-way control valve 148. A pair of tubes 158, 160 connect a pair of secondary adsorption beds 162, 164 to the output of the secondary four-way control valve 148. A pair of the outputs from the secondary four-way control valve 148 each lead to secondary adsorption beds 162, 164. The primary and secondary adsorption beds 136, 140, 162, 164 adsorb the molecules in the air other than oxygen and argon, similarly to the operation of the first and second adsorption beds 56, 58 described in the first embodiment of the invention.

The outputs of the secondary adsorption beds 162, 164 control adjustable relief valves 166, 168, respectively, positioned downstream from the secondary adsorption beds 162, 164. The primary four-way control valve 142 and the secondary four-way control valve 148 are controlled by the air pressure of the output at the relief valves 166, 168 through a pair of control tubes 170, 172, respectively. When the pressure at the output of one of the secondary adsorption beds 162, 164 reaches a predetermined level, one of the relief valves 166, 168 allows the output gas to flow through one of the control tubes 170, 172 to cause the valves 142, 148 to shift to a new position. The relief valves 166, 168 can be adjusted to open at different pressures levels to permit optimum performance of the system.

The adjustable relief valve 166 supplies oxygen-enriched air to a product tank 174 through a first output tube 176, which contains a product check valve 178 therein. Similarly, the primary output of the second adjustable relief valve 168 passes through a second output tube 180 and a product check valve 182 to the product tank 174. The output of the product tank 174 passes through an output pressure regulator 183, an output limiting valve 184, an outlet check valve 186, an outlet flow control valve 188, an outlet bacteria filter 190 and out of an oxygen outlet port 192 for supply to a patient.

The primary four-way control valve 142 controls the flow of the intake air into the system 10a. During one stage of the cycle of operation of the system the primary four-way control valve 142 opens the conduit leading from the first primary adsorption bed 136 to the conduit 150 leading to the blower 152 to permit the blower 152 to draw air in through the first primary adsorption bed 136. When the valve 142 is set this way, the conduit leading from the second primary adsorption bed 140 is opened to a purge conduit 146. During this first stage of the cycle, the secondary four-way control valve 148 is set to direct the air output from the secondary water trap 156 to the first secondary bed 162 and to open the purge line 146 to the second secondary adsorption bed 164.

A portion of the output of the first secondary adsorption bed 162 passes through a puge tube 194 into the second secondary adsorption bed 164 and then through the secondary four-way control valve 148, the purge tube 146, and the primary four-way control valve 142 to the secondary primary adsorption bed 140. The flow of oxygen-enriched air through the secondary adsorption bed 164 and the primary adsorption bed 140 purges impurities therefrom to prepare the system 10a for the second phase of its operating cycle.

The pressure of the output from the first secondary adsorption bed 162 is transmitted through the control conduit 170 to the first and second control valves 142, 148. The relief valve 166 is set so that when the pressure at the outlet of the first secondary adsorption bed 162 reaches a predetermined level, such as 14.7 pounds per square inch gauge, it allows gas into the control conduit 170 to shift the control valves 142, 148 to begin the second stage of the operating cycle of the system. The pressure selected is the adsorption bed output pressure that indicates the adsorption material has reached, or is close to reaching, saturation.

In the second stage of operation, the primary control valve 142 is configured so the output of the second primary adsorption bed 140 is coupled to the blower conduit 150 so the blower 152 draws air through the second primary adsorption bed 140. The control valve is also set so the purge tube 144 is open to the first primary adsorption bed 136, but the first primary adsorption bed 136 is cut off from the blower conduit 150.

The secondary four-way control valve 148 is configured so the air output from the secondary water trap 156 flows into the second secondary adsorption bed 164, and the first secondary adsorption bed 162 is opened to the purge tube 144, and closed to the air output of the water trap 156.

During this second stage of the operating cycle the primary and secondary four-way control valves 142, 148 route intake air through the second primary adsorption bed 140 and the second adsorption bed 164 to supply oxygen enriched air to the product tank 174. A portion of the oxygen output of the second secondary adsorption bed 164 passes through the purge tube 194 into the first secondary adsorption bed 162 and flows through the secondary four-way control valve 148, the purge tube 144, the primary control valve 142, and to the first primary adsorption bed 136 to purge impurities from the second primary and secondary adsorption beds 140, 164.

Positioning the control valves and the blower or compressor between the primary adsorption beds and the secondary adsorption beds permits the use of fewer valves than in prior devices, greatly simplifying the plumbing arrangements so the system is less prone to leaks and pressure losses. Additionally, the arrangement of the invention allows a smaller blower or compressor to be used, as the blower or compressor pulls the air through one adsorbent stack and pushes it through the adsorption beds, rather than pushing the air through two sets of sieve beds, as the prior art systems do. Such a smaller blower or compressor is smaller in size and requires less power to drive the air through the system, reducing the overall power requirements of the system and increasing its portability.

Referring to FIG. 4, a control system for the second embodiment shown in FIG. 3 includes a power source 202, which may be a 9 volt or a 12 volt battery, having positive and negative outputs connected to a battery charge level indicator 204 and to an on/off switch 206. The connections shown with broken lines are optional. The negative terminal of the power source is also connected to an alarm control circuit 208. The outputs of the on/off switch 206 are optionally connected to a timer 210 and to the blower 152, a power converter 214 and the alarm control circuit 208. The blower 152 may include a thermal switch 216 to avoid overheating. The alarm control circuit 208 receives power from an alarm battery 218. The alarm 220 may include a visual alarm indicator and an audible alarm buzzer.

The power converter 214 may include a plug 222 for connecting the power converter to a 110 volt AC source, such as is commonly available in a home or office. The power converter 214 may further include a 12 volt DC connector 224 to permit connection to a 12 volt DC source, such as an automobile cigarette lighter. A three position power selection switch 226 connected to the 110 volt DC plug 222 and the 12 volt DC plug 224, and to the output of the converter 214 permits selection on one of three different power sources for operating the blower.

The use of the air-controlled four-way valves 142,148 eliminates the need for electrical valves to control the product flow. Thus, the blower 152 is the only component of the system 10a requiring electrical power. This reduces the power requirements for the system, enabling the system to be smaller and lighter.

Figure 5:
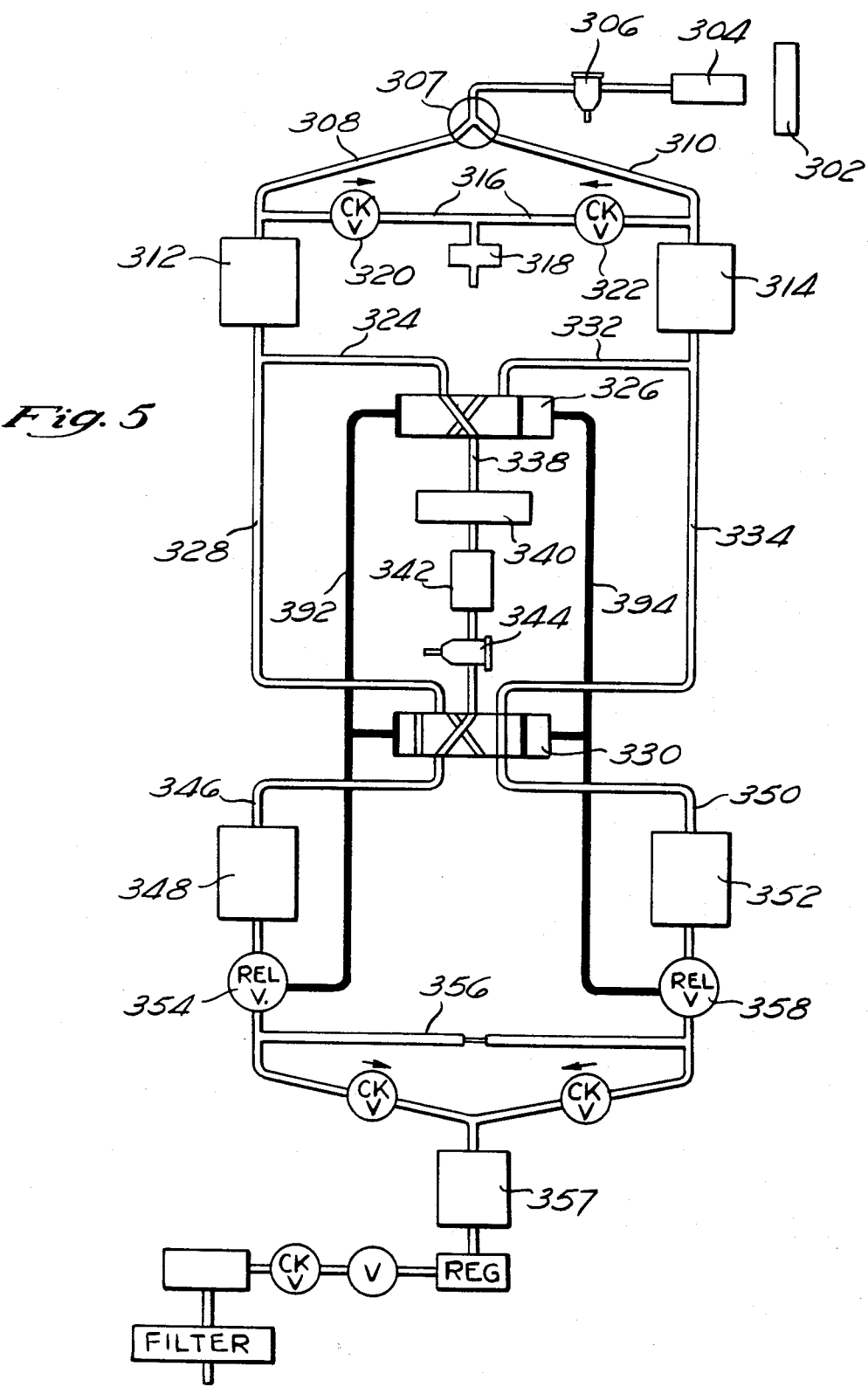
FIG. 5 is a pneumatic schematic diagram of a third embodiment of the invention.

The Embodiment of FIG. 5

In the embodiment of FIG. 5, air is taken in through a gross particle filter 302, which removes large particles from the intake air. After passing through the gross particle filter 302, the intake air passes through an intake muffler 304 and a primary water trap 306. A pair of tubes 308,310 lead from the water trap 306 to a pair of primary adsorption beds 312,314, as controlled by a Y valve assembly 307. A purge line 316 connects the tubes 308,310. The output of the purge line 316 passes through an exhaust muffler 318. The purge line 316 contains a pair of check vales 320,322 for controlling the direction of flow through the purge line 316.

The output of the first primary adsorption bed 312 passes through a line 324 to a three-way air controlled valve 326. Similarly, the output of the second primary adsorption bed 314 passes through a line 332 to the three-way valve 326. An output line 338 of the three-way valve 326 leads to an air blower 340, a heat exchanger 342 and a secondary water trap 344.

The primary control valve 326 is configured to alternatively couple the line 324 to the output 338 or the line 332 to the output line 338. When the output line 338 is coupled to the first line 324, the input air is drawn through the first primary adsorption bed 312 by the blower 340. When the valve 326 connects the second line 332 to the output line 338, the blower 340 draws the input air through the second primary adsorption bed 314.

When the primary valve 326 is set to direct air from the first line 324 to the blower line 338, the four-way valve 330 is set to direct air from the water trap 344 to the secondary adsorption bed line 346 and the first secondary adsorption bed 348. At the same time, the four-way valve is set so the purge line 334 is open to the second secondary adsorption bed line 350.

When the three-way valve 326 is set so the blower 340 draws air from the second line 332 through the valve 326, the four-way valve 330 is set so the air leaving the secondary water trap 344 is directed into the second secondary adsorption bed line 350. At the same time, the four-way valve 330 opens the first secondary adsorption bed line 346 to the purge line 328.

During the first stage of operation, when the air is being drawn through the first primary adsorption bed 312 and the first secondary adsorption bed 348, an adjustable relief valve 354 connected to the output of the first secondary adsorption bed 348 apportions oxygen-enriched air among (1) the air-controlled three-way valve 326, (2) the air-controlled four-way valve 330, (3) a purge line 356, and (4) a product tank 357.

When the pressure of the output oxygen at the outlet of the first secondary adsorption beds 348 reaches a predetermined level, the relief valve 354 admits gas to the control line 392 leading to the three-way control valve 326 and the four-way control valve 330. The valves 326,330 shift so the blower 340 draws air through the second primary adsorption bed 314 and the second secondary adsorption bed 352. The pressure at which the valves 354,358 admit gas to the control lines 392,394 to shift the control valves 326,330 is preset to a selected pressure, such as 14.7 pounds per square inch gauge, which pressure is selected as the pressure that the output product of the secondary adsorption bed 348 reaches when the adsorption material is just about saturated.

During the first stage of operation, a portion of the product oxygen-enriched air flows through the purge tube 356 into the second secondary adsorption bed 352, through the four-way valve 330 into the purge line 334, through the second primary adsorption bed 314, and out through the exhaust muffler 318 on the purge line 316. A valve in the Y valve assembly 307 prevents the purge gasses from reentering the system through the first line 308. This Y valve assembly 307 is described below.

The check valve 320 ensures that during the first stage of the operating cycle the purge gasses flowing from the second primary adsorption bed 314 do not re-enter the first primary adsorption bed 312.

When the pressure in the control line 392 causes the three-way valve 326 and the four-way valve 330 to shift and begin the second stage of the operating cycle, the air is drawn by the blower 340 through the second primary adsorption bed 314, and directed through the second secondary adsorption bed 352. A portion of the product flows through the purge line 356 and purges the first secondary adsorption bed 348 and the first primary adsorption bed 312 through the purge line 328.

The check valve 322 on the purge line 316 ensures that during the second stage of the operating cycle the purge gasses from the first primary adsorption bed 312 do not enter the second primary adsorption bed 314.

The Y valve assembly 307 adjacent the input of the system controls the direction of the flow of the incoming air to the proper primary adsorption bed 312,314, and prevents the purge gasses from flowing into the wrong section of the system as seen from FIG. 6.

The valve assembly 307 includes an inlet valve 360 connected to the outlet of the primary water trap 306. In the inlet valve is a valve element 362 that seals with an annular valve seat 368 to control flow through the inlet 360. The valve element is mounted on a valve stem 364 and is urged into valve closing position by a spring 366 surrounding the stem and compressed between the valve element 362 and a support structure 367.

A first outlet valve 370 leads to the line 308 leading to the first primary adsorption bed 312. A second outlet valve 372 leads to the second line 310 and the second primary adsorption bed 314. Each of these outlet valves is substantially identical to the inlet valve 360, with valve elements 374,376, valve stems 378,380, biasing springs 382,384, and valve seats 386,388.

When the three-way valve 326 is connected so the output line 324 from the first primary adsorption bed 312 is coupled to the blower line 338, the suction drawn on the first line 308 and the first outlet 370 of the Y valve assembly 307 causes the first outlet valve element 374 to be drawn away from the seat 386 to open the first outlet valve 370. The suction then pulls against the inlet valve element 362, to pull it away from the inlet seat 368. With the inlet valve 366 and the first outlet valve 370 open, when the air is drawn in through the gross particle filter 302, the intake muffler 304, and the water trap 306, to the first line 308. The springs 366, 382 are relatively weak so the valve elements 362, 374 are readily unseated.

When the three-way valve 326 is configured so the line 332 is open to the blower line 338, and the blower 340 draws air through the second primary adsorption bed 314 and the second line 310, the vacuum on the second outlet valve 372 pulls the valve element 376 away from the seat 388, and then pulls the inlet valve element 362 away from the seat 368 to draw the air into the second line 310. Since during this second stage of the cycle of operation, the first primary adsorption bed 312 and the first line 308 are shut off from the blower 340 by the three-way valve 326, there is no suction on the first outlet valve 370, and the biasing caused by the spring 382 pushes the valve element 374 against the seat 386 to close the first outlet valve 370. Additionally, the vacuum drawn on the second output valve 372 assists in pulling the valve element 374 of the first outlet closed.

Thus, operation of the Y valve 307 is automatic during the overall system operation. Screw threads 390 on each of the inlet and outlet valves 360, 370, 372, of the Y valve assembly 307 allow the amount of biasing of the springs 366, 382, 384, to be adjusted.

The electrical control system discussed with reference to the second embodiment of the invention and shown in FIG. 4 provides satisfactory means for controlling the electrical portions of the third embodiment. Again, the only element requiring electrical power is the blower or compressor 340.

The Embodiment of FIGS. 7 and 8

Air drawn into the system of FIG. 7 passes through a gross particle filter 402, an intake muffler 404, and a primary water trap 406. The gross particle filter 402 eliminates major particulate matter such as dust, soot, etc., from the intake air. The intake muffler 404, with its internal baffles, reduces the noise associated with the intake of the outside air. The primary water trap 406 removes water from the air so it does not contaminate the adsorption beds in the system.

After passing through the gross particle filter 402, the intake muffler 404, and the primary water trap 406, the intake air passes through an electrically controlled solenoid valve 408. The solenoid valve 408 controls the flow of air through a first line 410 and an intake check valve 412 to the first primary adsorption bed 414 and the air flow through a second line 416 and a second intake check valve 418 into a second primary adsorption bed 420. Operation of the electrical solenoid valve 408 by turning on the system opens the inlet, allowing air to be drawn into the system. When the power is turned off, the valve 408 is closed, sealing the intake port to prevent contamination of the system elements when the system is not in use.

A purge line 422 extends between the first and second lines. The purge line 422 contains a pair of check valves 424,426, which ensure that purged material passes through an exhaust muffler 428 rather than into the intake of one of the adsorption beds.

The output of the first and second primary adsorption beds 414,420 are input to an air controlled three-way valve 430. A fan 432 is connected to the output 434 of the three-way valve 430 to draw air through the system. When the blower 432 is turned on and the electrically operated solenoid valve 408 opened, air is drawn into the system through the gross particle filter 402, the intake muffler 404, the water trap 406, and into one of the primary adsorption beds 414,420. The operation of the three-way valve 430 determines which of the primary adsorption beds 414,420 the air is drawn through.

After passing through the blower 432, the air passes through a heat exchanger 436 and a secondary water trap 438 before entering a second air-controlled three-way valve 440, which controls the direction of flow of the output air to secondary adsorption beds 442,444. The second three-way flow control valve 440 has a first output 441 connected to a first secondary adsorption bed 442 and a second output 443 connected to a second secondary adsorption bed 444.

The output of the first secondary adsorption bed 442 passes through an adjustable relief valve 446, which apportions the output oxygen-enriched air among (1) a control line 448, (2) a second purge line 450, and (3) a product tank 452. The control line 448 is connected to the first and second three-way flow control valves 430, 440 for controlling the operation of these valves.

The output of the second secondary adsorption bed 444 passes through a second relief valve 454, which apportions the output oxygen-enriched air among (1) a second control line 456, (2) the second purge line 450, and (3) the product tank 452. The second control line 456 also provides operating air to the first and second three-way control valves 430,440.

The operation of first and second three-way valves 430,440 is controlled by the pressure of the gas in the control lines 448,456. The flow of gas into the control lines 448, 456 is controlled by the relief valves 354,358. The relief valves 354,358 are adjustable so that a predetermined pressure causes gas to enter one of the control lines 448,456 to apply sufficient pressure on the valve operators in the control valves 430,440 to shift the valve operators to change their direction of flow through the three-way valves 430,440. For example, if the valves are initially set so air drawn into the system is drawn through the first primary adsorption bed 414 by the blower 432, then pushed through the first secondary adsorption bed 442 when the pressure of the output product from the first secondary adsorption bed 442 reaches a certain level indicating that the adsorption material has come close to reaching saturation, this pressure, through the control line 448, switches the first and second three-way valves 430,440 to cause the blower 432 to draw the air through the second primary adsorption bed 420 and push it on through to the second secondary adsorption bed 444.

As in the previously described embodiments of the system, while the air is being drawn through the first primary adsorption bed 414 and the first secondary adsorption bed 442, a portion of the product flows through the purge line 450, and in a reverse direction through the second secondary adsorption bed 444, the second primary adsorption bed 420, and to the atmosphere through the exhaust muffler 428. During the purging process the purge gas is directed through the direct connection line 458 from the second secondary adsorption bed 444 to the second primary adsorption bed 420, since the second three-way valve 440 has closed off the second output 443. A check valve 460 on the direct connection ine 458 allows the purge gas to flow from the secondary adsorption bed 444 to the primary adsorption bed 420, but prevents the flow of air from the primary adsorption bed 420 to the secondary adsorption bed 444.

The check valves 418,424 ensure that the purge gasses from the second adsorption beds 420,444 are exhausted through the exhaust muffler 428, and are not permitted to enter the first primary adsorption bed 414.

When the pressure of the output from the first secondary adsorption bed 442 reaches the predetermined level so the gas in the control line 448 causes the first and second three-way valves 430,440 to shut off the flow of air through the first adsorption beds 414,442, and opens the valves 430,440 to draw the air through the second adsorption beds 420,444, a portion of the output of these second secondary adsorption bed 444 is drawn through the purge line 450 and used to purge the first adsorption beds 442,414.

During the purging of the first adsorption beds 414,442, the purge gasses flow through the direct connection line 462. The check valve 464 on the direct connection line 462 prevents the flow of air through the direct connection line 462 when the first adsorption beds are being used to concentrate the oxygen.

The check valves 412 and 426 ensure that the purge gasses from the first adsorption beds 414,442 do not enter the second primary adsorption bed 420, but are exhausted through the exhaust muffler 428.

FIG. 8 is a schematic diagram of an electrical control system for use in connection with the embodiment illustrated in FIG. 7. Again, the dashed lines indicate optional connections within the circuit. A primary power source 470, which may be a 9 volt or 12 volt battery, has positive and negative terminals connected to an on/off switch 472 and to a battery charge level indicator 474. The positive and negative outputs of the on/off switch 472 are connected to the solenoid valve control 476, which controls the solenoid valve 408 (FIG. 7), and to the fan 432, which forces air through the system. The fan 432 preferably includes a thermal switch 478 to prevent overheating.

An alarm control circuit 480 is connected to the negative terminal of the battery 470 and to the negative output of the on/off switch 472 to alert the user or other person of a malfunction in the operation of the system. A separate alarm power source 482, which may be a 9 volt battery, provides power to the alarm control circuit 480 independent of the primary power source 470. An alarm buzzer and/or light 484 to give an audible or visible indication of alarm conditions. Among the alarm conditions that cause the alarm control 480 to actuate the alarm output 484 are a failure of the primary power source 470, a failure of the fan 432, or other change in conditions that seriously interferes with the oxygen production of the system.

An optional three-way control switch 486 permits the user to select among the primary power source 470, a 110 volt AC power source connected to the AC plug 488, or a DC voltage source connected to a DC voltage adaptor 490, such as an automobile cigarette lighter. An AC to DC converter 492 is interposed between the AC plug 488 and the remainder of the circuit to convert the input AC power to the DC voltage on which the elements of the system operate. A DC voltage converter (not shown) may be interposed between the DC voltage connector 490 and the other elements of the circuit if the DC adaptor 490 is intended to be connected to a voltage source having a different voltage than the primary power source 470.

Therefore, the system illustrated in FIGS. 7 and 8 has the capability of drawing power from either the battery, an automobile cigarette lighter outlet, or a 110 volt AC outlet.

A timer 496 can be connected to the on/off switch 472 to control the operation of the system if timed control, rather than demand or continuous operation of the system is desired.

I claim:

1. An apparatus for taking in a gas containing a plurality of components and producing a product gas having an increased concentration of a given component of the intake gas, the apparatus comprising:
   an apparatus gas intake port;
   a pair of primary adsorption beds, having an inlet coupled to the intake port and an outlet, and containing an adsorbent material for removing from the gas at least one of the components other than the given component;
   a pair of secondary adsorption beds, each having an inlet an outlet and containing an adsorbent material for removing from the gas at least one component other than the given component;
   valving means coupled between the primary adsorption beds and the secondary adsorption beds for alternatively directing gas through the first primary and first secondary adsorption beds, or through the second primary and second secondary adsorption beads;
   a blower coupled to the outlets of the primary adsorption beds and to the inlets of the secondary adsorption beds for causing a flow of air through the primary and secondary adsorption beds;
   a moisture separator for removing moisture from the gas wherein the moisture separator is coupled to the apparatus so the gas flowing through the primary adsorption beds and the secondary adsorption beds flows through the moisture separator; and
   a purge conduit for directing a portion of the product gas output from the first secondary adsorption bed through the second secondary adsorption bed and the second primary adsorption bed when the valving means directs the gas flow through the first primary and first secondary adsorption beds, and for directing a portion of the product gas output from the second secondary adsorption bed through the first secondary and first primary adsorption beds when the valving means directs the gas flow through the second primary and secondary adsorption beds.

2. The apparatus of claim 1, wherein the moisture separator is coupled between the apparatus intake port and separator is coupled between the apparatus intake port and the inlets of the primary adsorption beds to remove moisture from the gas entering the primary adsorption beds.

3. The apparatus of claim 1, additionally comprising a second moisture separator, wherein the first moisture separator is coupled between the apparatus intake port and the inlet of the primary adsorption bed to remove moisture from the gas entering the first primary adsorption bed, and the second moisture separator is coupled between the apparatus intake port and the inlet of the second primary adsorption bed to remove moisture from the gas entering the second primary adsorption bed.

4. The apparatus defined in claim 1, wherein the operation of the valving means is controlled by the pressure of the product gas output from the secondary adsorption beds.

5. The apparatus of claim 4, wherein said valving means comprises:
   a first valve coupled between the outlets of the primary adsorption beds and the blower to alternatively couple the blower to the first primary adsorption bed or to the second primary adsorption bed to cause the blower to alternatively draw gas from the apparatus intake port through the first primary adsorption bed or through the second primary adsorption bed; and
   a second valve coupled between the blower and the inlets of the secondary adsorption beds to alternatively couple the blower to the first secondary adsorption bed or to the second secondary adsorption bed to cause the blower to alternatively drive gas through the first secondary adsorption bed or through the second adsorption bed.

6. An apparatus for taking in ambient air and increasing the concentration of oxygen component thereof to output oxygen-enriched air, the apparatus comprising:
   an intake water trap for removing at least some moisture from the intake air;
   first and second primary adsorption beds, each having an and an outlet and containing an adsorbent material for removing from air at least one component other than oxygen, wherein the input of the first and second primary adsorption beds are each coupled to the intake water trap;
   a three-way valve having two input ports and an output port, wherein the first input port is coupled to the outlet of the first primary adsorption bed and the second input port is coupled to the outlet of the second primary adsorption bed, wherein the three-way valve alternatively selects a first connection in which the first input port is coupled to the output port or a second connection in which the second input port is coupled to the output port;
   a blower coupled to the output port of the three-way valve for drawing air through the intake water trap and one of the primary adsorption beds, wherein:
      when the three-way valve couples the first input port to the output port, the first primary adsorption bed is coupled to the blower so the blower can draw air through the first primary adsorption bed; and
      when the three-way valve couples the second input port to the output port, the second primary adsorption bed is coupled to the blower so the blower can draw air through the second primary adsorption bed;
   a secondary water trap coupled to the output port of the three-way valve for removing additional moisture from the air, the secondary water trap being connected so the air drawn by the blower through the intake water trap and one of the primary adsorption beds flows through the secondary water trap;
   a four-way valve having a primary input port, first and second primary output ports, and first and second secondary output ports, wherein the four-way valve alternatively selects a first connection or a second connection, wherein:
      the first connection couples the primary input port to the first primary output port, and the second primary output port to the second secondary output port; or
      the second connection couples the primary input port to the second primary output port and the first primary output port to the first secondary output port;
   first and second secondary adsorption beds, each having an inlet and an outlet and containing an adsorbent material for removing from air at least one component other than oxygen, wherein the inlet of the first secondary adsorption bed is coupled to the first primary output of the four-way valve, and the inlet of the second secondary adsorption bed is coupled to the second primary output port of the four-way valve;
   a primary purge conduit connecting the outlet of the first secondary adsorption bed to the outlet of the second secondary adsorption bed;
   a first secondary purge line connected between the first secondary output port of the four-way valve and the outlet of the first primary adsorption bed; and
   a second secondary purge conduit connected between the second secondary output port of the four-way valve and the outlet of the second primary adsorption bed.

7. The apparatus of claim 6, wherein:
   the operation of the three-way valve is controlled by the pressure of the oxygen-enriched air output from the secondary adsorption beds to cause the three-way valve to shift between the first connection and the second connection;
   the operation of the four-way valve is gas pressure operated, controlled by the pressure of the oxygen enriched air output from the secondary adsorption beds to cause the four-way valve to shift between the first connection and the second connection; and
   the apparatus additionally comprises first and second control conduits, wherein the first control conduit is coupled between the outlet of the first secondary adsorption bed and the three-way valve and the four-way valve, and the second control conduit is coupled between the outlet of the second secondary adsorption bed and the three-way valve and the four- way valve.

8. The apparatus of claim 6, additionally comprising a check valve assembly coupled between the intake water trap and the inputs of the first and second primary adsorption bed to direct the intake air flow to the first and second primary adsorption beds, the check valve assembly comprising an input port and first and second output ports, wherein:
   the input port is coupled to the intake water trap;
   the first output port is coupled to the input of the first primary adsorption bed;
   the second output port is coupled to the input of the second primary adsorption bed;

the input port and the first and second output ports each comprise a valve element that seats against a sealing member to close the port, wherein:

when the three-way valve selects the first connection to couple the first primary adsorption bed to the blower so the blower draws air through the first primary adsorption bed, the valve element of the first output port and the valve element of the inlet port; and when the three-way valve selects the second connection to couple the second primary adsorption bed to the three-way valve outlet port so the blower draws air through the second primary adsorption bed, the valve element of the second outlet port and the valve element of the inlet port are drawn open.

9. An apparatus for taking in ambient air and removing at least one of the components thereof to produce oxygen-enriched air, the apparatus comprising:

an apparatus gas intake port;

first and second primary adsorption beds coupled to the intake port in parallel, wherein each primary adsorption bed has an inlet coupled to the apparatus intake port and outlet, and contains an adsorbent material for removing from air at least one component thereof other than oxygen;

a primary three-way valve having first and second input ports and an output port, wherein the three-way valve alternatively selects a first connection to couple the first input port to the output port or a second connection to couple the second input port to the output port, and wherein the first input port is coupled to the outlet of the first primary adsorption bed, and the second input port is coupled to the outlet of the second primary adsorption bed;

a blower coupled to the output port of the primary three-way valve so when the primary three-way valve selects the first connection, the blower is coupled to the first primary adsorption bed, and when the primary three-way valve selects the second connection, the blower is coupled to the second primary adsorption bed, so the blower can alternatively draw air from the apparatus intake port through the first primary adsorption bed or through the second primary adsorption bed;

a secondary three-way valve having an input port and first and second output ports, wherein the input port is coupled to the output of the blower, wherein the secondary three-way valve alternatively selects a first connection to couple the input port to the first output port, or a second connection to couple the input port to the second output port;

a first secondary adsorption bed having an inlet coupled to the first output port of the secondary three-way valve and an outlet, and containing adsorbent material for removing from air at least one component thereof other than oxygen;

a second secondary adsorption bed having an inlet coupled to the second output port of the secondary three-way valve and an outlet, and containing an adsorbent material for removing from air at least one component thereof other than oxygen;

a first purge conduit coupled between the outlets of the first and second secondary adsorption beds;

a first secondary purge conduit coupled between the inlet of the first secondary adsorption bed and the outlet of the first primary adsorption bed;

a second secondary purge conduit coupled between the inlet of the second secondary adsorption bed and the outlet of the second primary adsorption bed.

10. The apparatus of claim 9, additionally comprising an inlet valve coupled to the apparatus intake port for closing the intake when the blower is not turned on to draw air through the primary and secondary adsorption beds.

11. An apparatus for taking in an intake gas containing a plurality of components and producing a product gas having an increased concentration of a given component of the intake gas, the apparatus comprising:

an apparatus gas intake;

one or more primary adsorption beds, each having an inlet and an outlet and containing an adsorbent material for adsorbing at least one of the components of the intake gas, other than the given component, wherein the inlet is coupled to the apparatus intake;

a pair of secondary adsorption beds, each having an inlet and an outlet and containing an adsorbent material for adsorbing at least one component of the intake gas, other than the given component;

a blower coupled to the outlet of each primary adsorption bed and to the inlets of the secondary adsorption beds for drawing the intake gas through the primary adsorption bed and driving air through the secondary adsorption beds;

valving means coupled between the blower and the inlets of the secondary adsorption beds for alternatively directing gas driven by the blower through the first secondary adsorption bed or the second secondary adsorption bed; and a purge conduit connecting the outlet of the first secondary adsorption bed and the outlet of the second secondary adsorption bed.

12. The apparatus of claim 11, additionally comprising:

a second primary adsorption bed having an inlet and an outlet and containing an adsorbent material for adsorbing at least one component of the intake gas other than the given component, wherein the inlet is coupled to the apparatus intake; and second valving means coupled between the outlets of the primary adsorption beds and the blower to alternatively direct gas drawn by the blower through the first primary adsorption bed or the second primary adsorption bed; wherein:

the second valving means directs the flow of purge gas from the secondary adsorption beds to the primary adsorption bed through which gas drawn by the blower is not being directed.

13. The apparatus of claim 11, wherein the operation of the valving means is controlled by the pressure of the product gas at the outlets of the secondary adsorption beds.

* * * * *

UNITED STATES PATENT AND TRADEMARK OFFICE
CERTIFICATE OF CORRECTION

PATENT NO. : 4,491,459
DATED : January 1, 1985
INVENTOR(S) : Pinkerton

It is certified that error appears in the above-identified patent and that said Letters Patent are hereby corrected as shown below:

Column 6, line 30, please correct "121 180° C" to --121 180°-- .

Column 7, line 63, please correct "the secondary bed" to --the secondary adsorption bed-- .

Column 14, line 25, please correct "bed, having" to --bed, each having-- .

Column 14, lines 63-64, please delete the duplicate text beginning with "and separator is coupled between the apparatus intake port". Claim 2 should correctly read:

2. The apparatus of claim 1, wherein the moisture separator is coupled between the apparatus intake port and the inlets of the primary adsorption beds to remove moisture from the gas entering the primary adsorption beds.

Signed and Sealed this

Twenty-fourth Day of September 1985

[SEAL]

Attest:

Attesting Officer

DONALD J. QUIGG

Commissioner of Patents and Trademarks—Designate